(12) United States Patent
Johnson

(10) Patent No.: US 11,455,860 B2
(45) Date of Patent: *Sep. 27, 2022

(54) METHOD AND SYSTEM FOR LINKING CASINO GAMES AND ON-LINE SOCIAL NETWORK GAMES

(71) Applicant: Tipping Point Group, LLC, Largo, FL (US)

(72) Inventor: Sam Johnson, Largo, FL (US)

(73) Assignee: Vulcan Gaming LLC, Buford, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/539,136

(22) Filed: Aug. 13, 2019

(65) Prior Publication Data

US 2020/0035062 A1    Jan. 30, 2020

Related U.S. Application Data

(63) Continuation of application No. 14/598,296, filed on Jan. 16, 2015, now Pat. No. 10,388,105, which is a continuation of application No. 13/415,183, filed on Mar. 8, 2012, now Pat. No. 8,956,211.

(51) Int. Cl.
*G07F 17/32* (2006.01)
*G06Q 30/02* (2012.01)

(52) U.S. Cl.
CPC ..... *G07F 17/3225* (2013.01); *G06Q 30/0209* (2013.01); *G07F 17/3244* (2013.01); *G07F 17/3255* (2013.01); *G07F 17/3272* (2013.01)

(58) Field of Classification Search
None
See application file for complete search history.

(56) References Cited

U.S. PATENT DOCUMENTS

| | | | |
|---|---|---|---|
| 8,360,862 B2 | 1/2013 | Allen et al. | |
| 8,360,873 B1 * | 1/2013 | Wickett | A63F 13/79 463/29 |
| 8,430,755 B2 | 4/2013 | Youm et al. | |
| 2002/0026354 A1 * | 2/2002 | Shoji | G06Q 30/0217 705/14.19 |
| 2003/0083943 A1 * | 5/2003 | Adams | G06Q 30/0277 705/14.23 |
| 2007/0021198 A1 | 1/2007 | Muir et al. | |
| 2007/0087820 A1 | 4/2007 | Van Luchene et al. | |
| 2008/0112802 A1 | 5/2008 | Johnson et al. | |
| 2008/0113773 A1 | 5/2008 | Johnson et al. | |
| 2008/0113802 A1 * | 5/2008 | Johnson | G07F 17/3267 463/40 |
| 2009/0069088 A1 | 3/2009 | Levitt et al. | |

(Continued)

*Primary Examiner* — Tramar Harper
(74) *Attorney, Agent, or Firm* — Weide & Miller, Ltd.

(57) ABSTRACT

Social media activities associated with an on-line social media system are linked to casino game activities and casino gaming machines. A player of a casino gaming machine may access a social media website via the casino gaming machine, such as to play a social media game at the casino gaming machine. A player may also access the social media system from a presentation computing device and, via that system, link to a casino gaming machine to play one or more casino wagering games. Social media currency and casino monetary credits may be exchanged or converted and other aspects of casino game play and social media activities may be integrated.

10 Claims, 6 Drawing Sheets

(56) References Cited

U.S. PATENT DOCUMENTS

| | | |
|---|---|---|
| 2009/0131146 A1 | 5/2009 | Arezina et al. |
| 2010/0062840 A1 | 3/2010 | Herrmann |
| 2010/0203963 A1 | 8/2010 | Allen et al. |
| 2010/0227675 A1* | 9/2010 | Luxton ............... G07F 17/3272 463/25 |
| 2010/0304853 A1* | 12/2010 | Kukita ................ G07F 17/3227 463/30 |
| 2011/0212762 A1* | 9/2011 | Ocko ...................... A63F 13/85 463/25 |
| 2011/0287823 A1 | 11/2011 | Guinn et al. |
| 2012/0004026 A1 | 1/2012 | Vann |
| 2012/0028718 A1 | 2/2012 | Barclay et al. |
| 2012/0122584 A1 | 5/2012 | Nguyen |
| 2012/0122590 A1* | 5/2012 | Nguyen .................. A63F 13/80 463/42 |
| 2012/0244950 A1 | 9/2012 | Braun |
| 2013/0036064 A1 | 2/2013 | Osvald et al. |
| 2013/0165199 A1 | 6/2013 | Lemay et al. |
| 2013/0165210 A1 | 6/2013 | Nelson et al. |
| 2013/0203489 A1 | 8/2013 | Lyons |
| 2013/0210512 A1 | 8/2013 | Meyer |
| 2013/0237300 A1 | 9/2013 | Johnson |

\* cited by examiner

METHOD AND SYSTEM FOR LINKING CASINO GAMES AND ON-LINE SOCIAL NETWORK GAMES

RELATED APPLICATION DATA

This application is a continuation of U.S. patent application Ser. No. 14/598,296, filed Jan. 16, 2015, issued as U.S. Pat. No. 10,388,105, which is continuation of U.S. patent application Ser. No. 13/415,183, filed Mar. 8, 2012, issued as U.S. Pat. No. 8,956,211, which prior applications are incorporated by reference as if set forth herein in their entirety.

FIELD OF THE INVENTION

The present invention relates to casino-style games such as wagering games presented at slot and video gaming machines or gaming tables, as well as to on-line social networking sites and games presented via said sites.

BACKGROUND OF THE INVENTION

A variety of gaming environments have been created. For example, various on-line gaming platforms have been created. Players may utilize their computers to access web-based games. These games may include wagering type games and, more commonly, promotional or "for pleasure" games.

Casinos also offer various forms of wagering games. These games generally include wager-based table games and video and slot-type games presented at gaming machines. These games can generally only be played if a player travels to a casino.

One additional form of gaming platform comprises the dedicated home gaming unit. Such units include the Nintendo Wii®, Microsoft X-Box® and Sony Playstation® game units. These units enable users to play games via their home televisions.

Each of these gaming systems or environments offers a different player experience. However, each gaming experience is generally segregated from the others. For example, a player might play games at home via their X-Box® gaming unit. In order to play a casino gaming machine or table game, however, a player must travel to a casino.

Another aspect of existing gaming platforms or environments is that they can be isolating. For example, a player of their X-Box® gaming unit may play all alone in their house, or a player might sit and play a casino gaming machine alone.

In some cases the existing gaming platforms allow a player to interact with other players. However, this interaction is generally very limited to other players on the same platform. For example, a Wii® player might link their game to other Wii® game players. Likewise, a player of a casino table game may interact with other players at the same game table. This interaction, however, is very limited.

SUMMARY OF THE INVENTION

Embodiments of the invention comprise methods and systems which link casino-style games, such as wagering games presented at slot or video gaming machines or gaming tables, to on-line social networks and social media games.

In one embodiment of the invention, a system and method permit a player to play a social media game via a casino gaming machine. In another embodiment of the invention, a system and method permit a player to play a casino game which is offered by a casino gaming machine at the player's presentation computing device, via a social media site or server.

As one aspect of a system of the invention, a player has an account with a social media site or network. The player may access their account via a presentation computing device, such as their home computer. The player may engage in social networking and related activities via the social media server or system. In addition, however, the player may seek to play a wagering game which is offered by a casino gaming machine which is located at casino. The social media system or server links to such a casino gaming machine so that a game offered by that machine can be played by the user via their presentation computing device.

Likewise, in accordance with such a system, a player may engage in wagering game play at the casino gaming machine. In addition, however, the player may access their social media account or otherwise link to the social media system or server from the casino gaming machine. In one embodiment of the invention, the player may then play one or more social media games which are offered by the social media system or server at the casino gaming machine.

As another aspect of the invention, social media game and casino game activities may be linked or impact one another. In one embodiment, a player may convert social media game points or currency into monetary credits which are usable for casino game play or vice versa.

The methods and system of the invention also allow a player of a casino gaming machine to link their casino game play and their social networking activities. For example, a player of a game at a casino gaming machine may link to other parties via a social media network, thus allowing the other parties to watch or engage in the player's play of the game. In addition, such a configuration of the invention permits a user of a social media network to link to a casino gaming machine player.

In accordance with the invention, casino game play and social media experiences are linked or merged.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiments of the invention comprise methods and systems which link casino-style games, such as wagering games presented at slot or video gaming machines or gaming tables, to on-line social networks and social media games. In general, the methods and systems of the invention permit a player to play a social media game via a casino gaming machine or play a casino game via a social media site. In one embodiment, social media game and casino game activities may be linked or impact one another. In one embodiment, a player may convert social media game points or currency into monetary credits which are usable for casino game play or vice versa. The methods and system of the invention also allow a player of a casino game to link their casino game play and social networking activities, including by allowing a player of a casino game to link to other parties via a social media network or by allowing a user of a social media network to link to a casino game player. Additional aspects of the invention, including the various embodiments thereof, will be described in more detail below.

Figure 1:
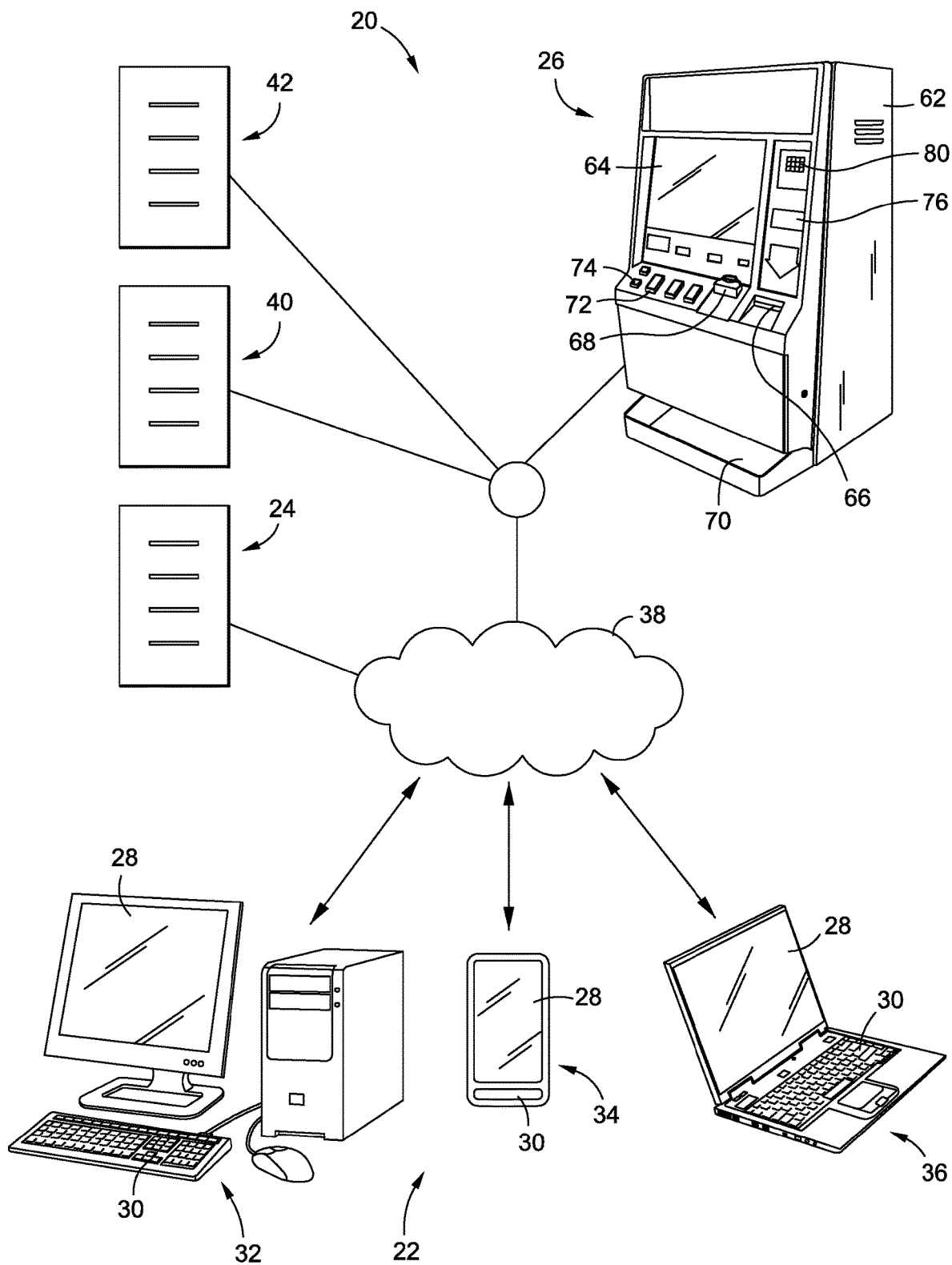
FIG. 1 diagrammatically illustrates one embodiment of a system in accordance with the invention.

As illustrated in FIG. 1, in one embodiment, a system 20 comprises one or more presentation devices 22 (it being understood that while there may be two or more presentation devices 22, for convenience herein, the system is primarily described relative to a player's use of a "presentation device 22"), one or more social media network or website servers 24 (it being understood that while there may be numerous social media servers 24, for convenience herein, the system 20 is primarily described relative to a single "social media server 24"), and a casino gaming machine 26.

The presentation device 22 may be a dedicated/special purpose device or may be a general purpose device. The presentation device 22 is preferably an electronic device, and more preferably a computing device. The presentation device 22 may include at least one video display 28 capable of displaying game information, at least one player input device 30, and at least one communication interface.

The presentation device 22 might comprise, for example, a desktop computer 32, a telephone (including cellular, wireless or wired telephones) or PDA 34 (such as an iPhone®), a laptop or notebook computer 36, or various other devices. As indicated, the presentation device 22 might also comprise a special purpose device such as a specially configured gaming tablet.

The player input device 30 might comprise, for example, a keyboard, mouse, joystick, touch-screen, button(s), trackballs or other devices now known or later configured and which are capable of receiving input from a player. The communication interface is preferably configured to permit information or data to be exchanged from one or more remote device or locations with the presentation device 22. The one or more communication interface might support wired or wireless communications using various protocols. For example, if the presentation device 22 is a PDA, the communications might be by 3G, 4G, IMT, GSM or the like. If the presentation device 22 is a desktop computer, the communications might be by TCP/IP or the like. Of course, other protocols may be used such as Bluetooth, 802.11xx and the like.

It will be appreciated that the presentation device 22 may include other components. For example, the presentation device 22 may include a main processor, a video and/or audio processor, input and output ports or the like.

The social media server 24 is preferably configured to host one or more social media websites. Such sites may have various forms, including offering various content and features. Preferably, in at least one embodiment, the social media server 24 offers one or more social media games to a player. Such games may have various forms. In one preferred embodiment, the games may be casino-like, but are not casino-style in that they are offered for pleasure or promotion only. Thus, while the social media games might require a player to utilize social media points or currency, the games are preferably not monetary casino-style games (wherein a player is required to place a monetary or monetary-equivalent wager).

One example of a social media server 24 comprises the server or system which hosts the well known Facebook™ social media site. Such a site offers various social media/networking features, including the ability of users to post information, such as personal information, which is accessible to other parties. In addition, the site offers non-monetary wagering games such as Perfect Poker, WSOP Poker, Zynga Poker, Poker Madness and others. These games may be played for social media points or currency. While a player may purchase the points or currency for use in playing these games, the points themselves have no "redemption value" in the sense that they do not have a monetary value equivalent (unlike casino game credits, as described below wherein each credit has an associated monetary value).

Such social media servers or systems 24 are well known. In one embodiment, the social media server 24 comprises means for generating response data or information. Such means may comprise at least one processor. The processor is configured generate game information, such as based upon the execution of machine readable game code (i.e. software). Of course, the processor could also be pre-programmed or configured as hardware configured to generate such game data.

In one embodiment, the social media server 24 includes means for storing information or instructions. Such means may comprise one or more memory devices. Such might comprise RAM, ROM (including EPROM, EEPROM, PROM) or other devices now known or later developed. The social media server 24 might include one or more other memory devices, such as for storing game state information or the like, as detailed below. In one embodiment, the social media server 24 might comprise or be in communication with one or more mass data storage devices, such as one or more hard drives or the like.

Preferably, the social media server 24 is preferably configured to store user information. As indicated above, such might comprise personal information regarding the user, some or all of which may be available for access or viewing by third parties. The social media server 24 may be configured to generate and present other information. For example, as described above, the social media server 24 may be configured to present one or more social media or on-line games. In one embodiment, the stored information may comprise user information, such as a user's personal information. Such information may be stored in association with a user's account.

The social media server 24 preferably also includes at least one communication interface, by which the social media server 24 may receive and transmit information. As with the presentation devices 22, the communication interface(s) may permit communications in accordance with various protocols and in various forms. In one embodiment, the communication interface may be configured so that the server 24 may transmit and receive data in accordance with a TCP/IP protocol over a wired network link with the Internet.

The social media server 24 might actually comprise a system or network of a plurality of elements or device For example, the social media server 24 might comprise a network or system which includes multiple servers and related devices such as data storage devices, user interface features and the like. Such might comprise, for example, a user station which includes a video display and one or input devices (such as a keyboard, mouse or the like). Such a user station may permit an operator to interface with and manage or control the social media server 24, such as to change operator settings and the like. The social media server 24 might also comprise a router and one or more separate computing devices. The functions of the various computing devices might be segregated. For example, one computing device or server might provide core social media functions while another server might support or enable social media site gaming-related activity.

As described in more detail below, at one or more times a presentation device 22 and the social media server 24 are linked by a communication link 38 between their communication interfaces. The type of communication link may vary, such as depending upon the particular type of presentation device 22 and/or the communication path or protocol which is utilized.

In one embodiment, the presentation device 22 and the social media server 24 may communicate through at least one network. Such a network might comprise a public and/or private network, including the Internet, a cellular network, a satellite communication network or the like. The network may comprise wired and/or wireless links or pathways. Of course, the communication link might comprise a dedicated link, such as a dedicated wired link between the devices. Further, the communication link might comprise a number of local, wide area or other networks or pathways linked together.

As indicated above, the system 20 preferably also includes one or more gaming machines 26. In a preferred embodiment, the gaming machines 26 are traditional casino-style gaming machines which are located at a casino (and as such are referred to as "casino gaming machines"). As described below, the casino gaming machines 26 may be part of a gaming system, such as a casino gaming system which links multiple of the gaming machines, one or more table games and other devices such as kiosks, accounting systems or servers, progressive systems or servers, player tracking systems or servers or the like.

Such traditional casino-style gaming machines 26 may have a plurality of features. For example, such a traditional casino gaming machine 26 may include a housing or cabinet 62 for enclosing/supporting various components of the gaming machine. The housing 62 may have a variety of configurations. In one embodiment, as illustrated, the housing 62 is configured so that the machine has an "upright" configuration. The casino gaming machine 26 might also be configured as a "slant"-type, "bar-top" or have other forms.

In one embodiment, the casino gaming machine 26 may be configured as a "video" type gaming machine, the machine including at least one display 64 for displaying game information to a player. The casino gaming machine 26 may include other means for providing information to a player. For example, speakers (not shown) or other devices may be provided for generating sound associated with the game. The casino gaming machine 26 may also include lights, printed instructions and other displays/display devices.

The games presented by the gaming machine(s) may be wagering type games wherein a player must place a bet or wager in order to play the game for the opportunity to receive winnings. Preferably, if the player is a winner of the game, the player is provided an award, such as a monetary payout (such as coins), credits representing monetary value, points or tangible prizes. As illustrated, the casino gaming machine 26 thus includes a bill validator/acceptor 66 for accepting paper currency and a coin acceptor 68 for accepting coins. Other means of payment, such as a credit card reader, may be provided. An award of winnings in the form of coins may be paid to the player via a coin tray 70.

Preferably, the casino gaming machine 26 includes means for a player to provide input. In one embodiment, this means comprises one or more buttons. For example, a "spin" button 72 may be provided for permitting a player to start a game. One or more wager buttons 74 may be provided for a player to select the amount to bet on a particular game. Other means of input may be provided, such as a touch-screen display and other devices now known or later developed.

A game controller (not shown) is provided for controlling the various devices of the gaming machine and for generating game information. For example, the game controller may be arranged to generate video and audio data for presentation by the display and speakers of the casino gaming machine 26. The game controller may be arranged to detect a signal from the coin acceptor indicating the receipt of coins or from the bill validator regarding accepted bills and for registering credits corresponding to those inputs, for subtracting credits for wagers placed by a player, and for causing a coin delivery mechanism to deliver coins from a coin hopper to the coin tray 70 for payment of winnings and/or return to a player of unwagered credits. Preferably, the one or more player input devices provide an output to the gaming controller for use in play of the game. For example, in response to a "bet one" input by a player, the gaming controller is preferably transmitted a signal which causes the gaming controller to initiate presentation of the game.

The casino gaming machine 26 may include one or more random number generators for generating random game events and results. As indicated above, such a random number generator might be utilized to generate the game symbols for the positions of a matrix, be utilized to generate the base symbols, and be utilized to select award values for each symbol position, among other things.

As indicated, in one embodiment, game information is displayed by a video display 64 to a player. That display may be of a variety of types, including CRT, LCD, plasma and others. The gaming machine 26 may also include more than one video display.

In another embodiment, the casino gaming machine 26 may include one or more physical reels capable of displaying symbols. In such a configuration, means are provided for rotating the physical reels. In one or more embodiments, the means may comprise a mechanical linkage associated with a spin arm, with movement of the spin arm (a "pull") by a user causing the reels to spin. In such an arrangement, the reels are generally allowed to free-wheel and then stop. In another embodiment, electronically controlled mechanisms are arranged to rotate and stop each reel. Such mechanisms are well known to those of skill in the art. In this arrangement, actuation of the spin arm or depression a spin button causes a controller (not shown) to signal the activation of the spin mechanism associated with one or more of the reels. Preferably, the controller is arranged to either turn off the signal to the device(s) effecting the rotation of each or all of the reels or generates a signal for activating a braking device, whereby the reels are stopped. As is well known, the combinations of reel positions and their odds of hitting are associated with the controller, and the controller is arranged to stop the reels in a position displaying a combination of indicia as determined by the controller based on the combinations and odds. The principal of such an arrangement is described in U.S. Pat. No. 4,448,419 to Telnaes, which is incorporated herein by reference. For example, the base symbols might be associated with spinning reels. Sets of base symbols might be generated by spinning those reels.

Such casino gaming machines 26 may have other configurations, including other features. For example, the casino gaming machine 26 may include a player tracking device, such as a card reader 78 and associated keypad 80. Such player tracking devices are well known and may permit the game operator to track play of players of the gaming machine. The tracked play may be utilized to offer player bonuses or awards.

In one embodiment, the casino gaming machine 26 may be configured to dispense media, such as printed paper tickets, which have associated value. For example, winnings or unused credits may be returned to the player via a printed ticket having value or associated value. In one embodiment, the casino gaming machine 26 might also be configured to accept such media for providing credit for game play. Relative to such casino gaming machines 26, an accounting server 40 may be used to generate ticket information to permit the gaming machine to dispense a value cash-out ticket, or to verify such a ticket which is presented at one of the casino gaming machines 26. Such systems are well known and thus not described in detail herein.

A casino may have numerous such casino gaming machines 26, such as located on a casino floor or in other locations. Of course, such casino gaming machines 26 might be used in other environments, such as an airport, a bar or tavern or other locations.

As used herein, the term "casino gaming machine" may include other types of gaming machines or device. Such might comprise, for example, gaming tables. Such tables may be manually operated or be fully or partially automated. A variety of games may be offered at such tables. Of course, the gaming machines may include other types of devices as well.

In a preferred embodiment, the invention has particular utility to gaming machines which include at least one player interface via which information may be presented or displayed to the player. Such an interface preferably comprises at least one electronic video display. Such a display might comprise, for example, a display of a gaming machine 26 such as described above, or such might comprise a display located at a gaming table or other device.

As indicated above and as illustrated in FIG. 1, the system 20 of the invention may further comprise other systems and components. In one embodiment, the system 20 may further comprise the above-referenced accounting server/system 40 and/or a player tracking server/system 42 or the like.

The accounting server 40 may track monetary transactions, including information regarding monetary value provided by a player, amounts wagered by a player and amounts won by a player, such as described in more detail below. The accounting server 40 may a computing device which has a processor for executing instructions, a memory for storing data such as instructions and monetary value information, and at least one communication interface. The accounting server 40 may comprise one device or a number of devices which are in communication with one another at one or more times. For example, the accounting server 40 may communicate with an external data storage device. Additional details regarding the account server 40 are described below.

The player tracking server 42 may be configured to store player identity information and information regarding the player's gaming or other activities, as is well known. The player tracking server 42 may a computing device which has a processor for executing instructions, a memory for storing data such as instructions and monetary value information, and at least one communication interface. The player tracking server 42 may comprise one device or a number of devices which are in communication with one another at one or more times. For example, the player tracking server 42 may communicate with an external data storage device. Additional details regarding the player tracking server 42 are described below.

As one aspect of the invention, a player may engage in social networking functions via a presentation device 22. For example, a player may access a social networking website which is hosted by the social media server 24. The player may be required, as is well known in the art of social media networking, to have a social media account. The player may input login or other identifying information in order to access their account and thus be able to engage in social networking functions which are supported by the social media network/server 24. Such functions are generally well known. For example, various social media sites permit users to post information which is then accessible by other users of the site, such as friends of the user. The site may also permit or facilitate other types of communication links between users and the like.

In one embodiment, the player may engage in the play of one or more social media games. For example, the social media website may include "play games" option. In one embodiment, the social media server 24 may generate game information which is transmitted to the player's presentation device 22.

As indicated above, in one embodiment, the player may be assigned social media points or currency or may purchase social media points or currency. The player may utilize the social media points or currency in order to play the one or more social media games. Winning social media game outcomes may include an award of additional points or currency, while a losing game outcome may result in a forfeiture of the points or currency. As is known in the art, the number of points of currency which a player possesses may determine what games the player can play and/or the size of fictitious wagers which the player can make during game play.

It will be appreciated that the social media games may be of various types and have various formats. For example, the social media games might comprise casino-like games such as poker, blackjack, bingo and other games. However, the social media games might comprise action-adventure games and the like. The games may be single or multi-player games.

Likewise, the player may play one or more games at the casino gaming machine 26. A player may travel to a casino and engage in play of a gaming machine 26. As indicated above, in a preferred embodiment, one of more of those games are offered only as wagering games in which monetary value must be wagered in order to play the game and where winning outcomes have awards of monetary value. The gaming machine 26 may be configured to present any of a wide variety of games which are now known or later developed, such as video slot games, video card games (such as video poker games), keno, bingo, mechanical slot games, lottery games or the like. Such games may also be single or multi-player games.

In accordance with a preferred embodiment of the invention, a player may play a casino game (i.e. a game which is presented by a casino gaming machine 26) via a presentation device 22, such as via the social media server 24, and/or play a social media game via a gaming device 26.

In one embodiment, a player may utilize a casino gaming machine 26 to play a social media game. For example, a player may access the social media website/server 24 via the casino gaming machine 26. As described below, the system 20, including the casino gaming machine 26, may be configured in various manners to accomplish this.

In one embodiment, the casino gaming machine 26 preferably allows the player to play one or more traditional casino-style games. However, the casino gaming machine 26 may also offer, such as via a menu, the ability of the player to access one or more social media games. For example, the casino gaming machine 26 may implement a web browser and provide an Internet connection which allows the user to access the social media website and access their social media account using their login information. At that point, the player may play the one or more social media games.

Most importantly, the social media game information is presented to the player via the casino gaming machine 26, rather than via a presentation device 22. For example, social media game information may be presented via the one or more video displays 64 of the casino gaming machine 26.

Figure 2:
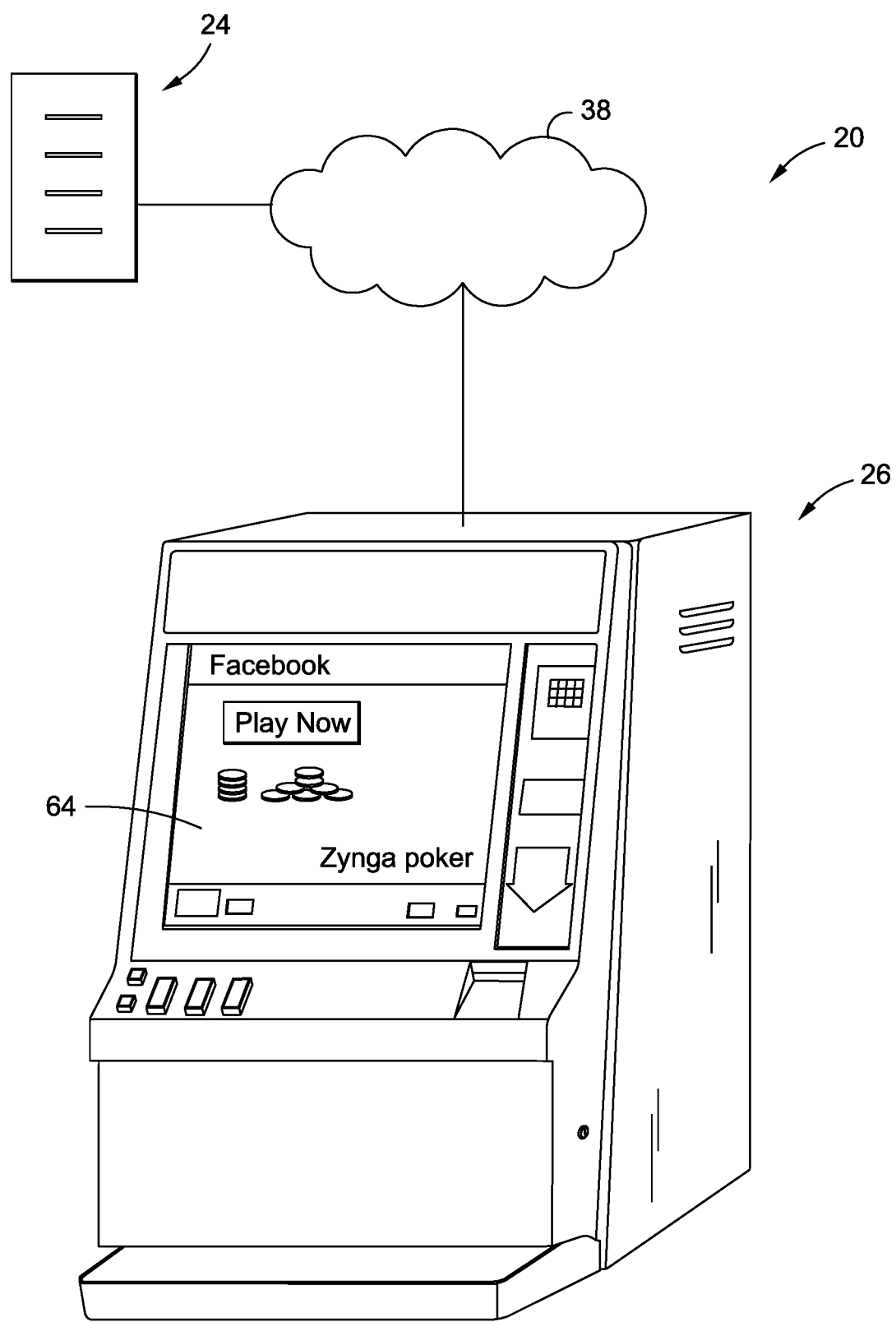
FIG. 2 diagrammatically illustrates a configuration of the invention in which a casino gaming machine displays content provided by a social media site server.

For example, as illustrated in FIG. 2, a player might access their Facebook™ page from a casino gaming machine 26. The player might then elect to play the game Zynga Poker™. As illustrated, the social media server 24 preferably serves or delivers the content to the gaming machine. As illustrated, this content if preferably displayed by the casino gaming machine 26, such as on the video display 64.

In this arrangement, the player may play casino-style games and/or social media games via a casino gaming machine. Of course, the player might switch back and forth between those games.

In another embodiment, a player may play a game which is presented via a casino gaming machine 26, at their presentation device 22. In a preferred embodiment, the gaming machine game is presented to the player via the social media system/server 24.

As one example, a player may access the social media system/server 24 via their presentation device 22. The play may, as indicated above, login or otherwise access their account. In one embodiment, the player may be presented with the option of playing a traditional social media game. In accordance with the present invention, however, the player may be presented with the option of playing a game which is presented via a casino gaming machine 26. In such a configuration, the casino gaming machine 26 and the social media server 24 are communicatively coupled, whereby game information which is presented by the casino gaming machine 26 can be routed to the player's presentation device.

Figure 3:
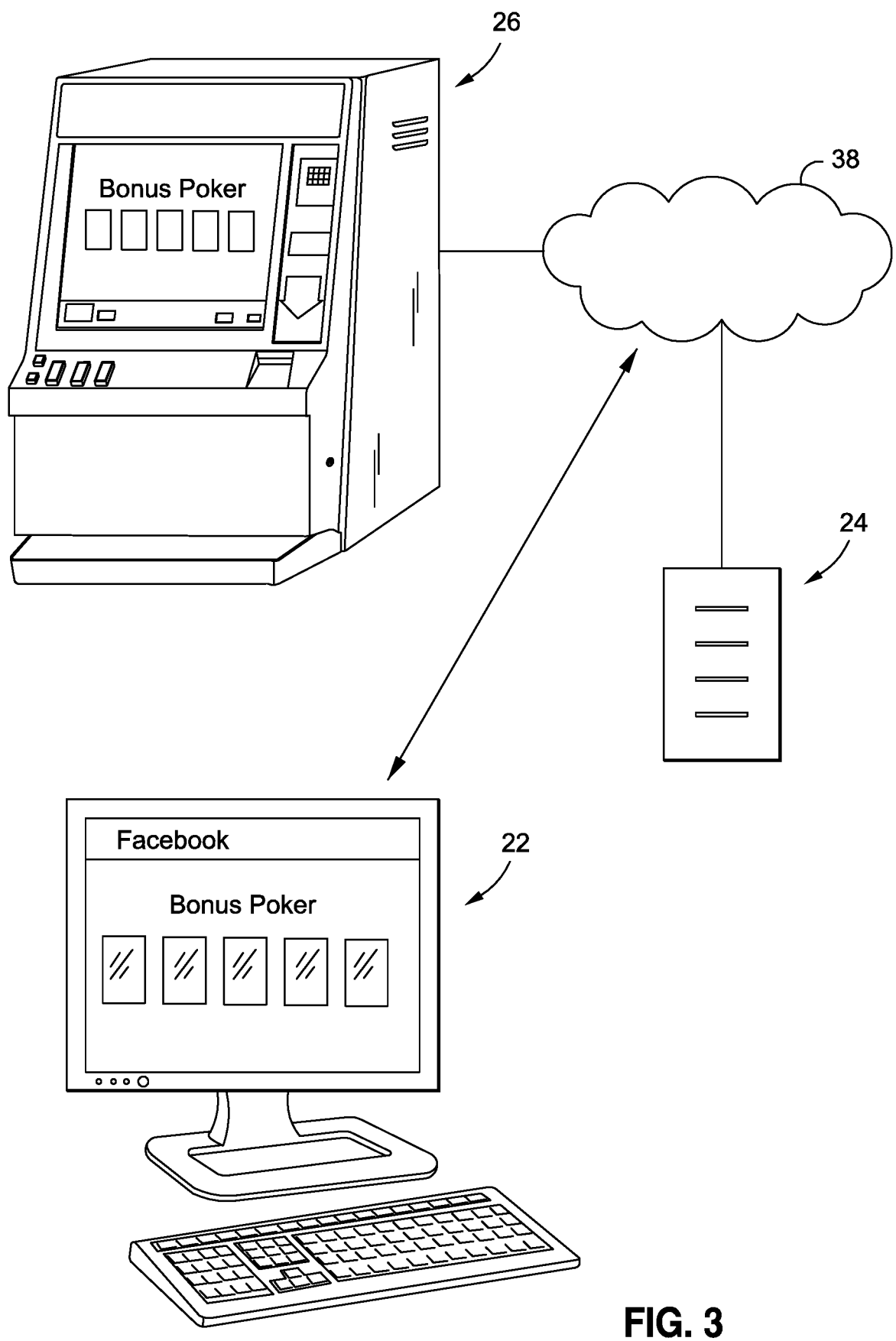
FIG. 3 diagrammatically illustrates a configuration of the invention in which a casino wagering game is presented at a computer of a social media site user.

For example, a casino gaming machine 26 may offer the game of Bonus Poker. As indicated above, a player might play such a game directly at the casino gaming machine 26. As illustrated in FIG. 3, a player might utilize their presentation device 22 to access the social media server 24, which in turn links to a casino gaming machine 26. As described below, the system 20 is preferably configured to link the player with the casino gaming machine 26, whereby the play may play the game (such as Bonus Poker) via their presentation device 22. Thus, as illustrated, game information regarding the casino game which is presented by the casino gaming machine 26 is provided to the player's presentation device 22.

It is noted that a player might play various types of casino games via the social media server 24. As indicated above, in one embodiment, such a game might comprise a video-type game such as video poker or video slots. As described in detail below, in such an embodiment the video output of a controller of a gaming machine may be routed (such as by being captured by a secondary controller and forwarded by that controller) to the social media server 24 (and thereon to the player's presentation device 22). In another embodiment, a player might remotely play a mechanical-reel slot casino game. For example, images of the slot reels might be captured or the reel positions or reel symbols might be captured and translated into video form for presentation by on a video display of the player's presentation device 22 (as one example, reel symbols are mapped to reel positions and the reel stopping positions are transmitted from the casino gaming machine to the social media server 24 which generates video images of the reel symbols corresponding to those reel positions and transmits the video images to the player's presentation device 22). In yet another configuration, a player might remotely play a casino table game wherein video or other information at the casino game table is forwarded to the social media server 24 for presentation at the player's presentation device 22 (for example, images of cards on the table could be forwarded or card information could be provided to the social media server 24 which then generates video images of card corresponding to that card data and transmits that video information to the player's presentation device 22).

As yet another aspect of the invention, as indicated above, a player may link their activities at a casino gaming machine 26 to a social networking experience. For example, as indicated above, a player might access their social media account via a casino gaming machine 26. As is known in the art of on-line social networking, this may allow the player to provide information to third parties (such as friends) and/or permit the player to interact with the third parties.

For example, in one embodiment of the invention a player might link to one or more third parties via the social media server 24. A player might play casino games at the casino gaming machine 26 while at the same time chatting with the linked third parties or otherwise posting or providing information to those third parties. In one embodiment, such information may even include information about the game which the player is playing. For example, a player might play a game of video poker at the casino gaming machine 26. The casino gaming machine 26 might be configured to transmit a video signal or other data to the social media server 24 of the game play, thus permitting third parties who are linked to the player to see the actual game play at the casino gaming machine 26.

Figure 4:
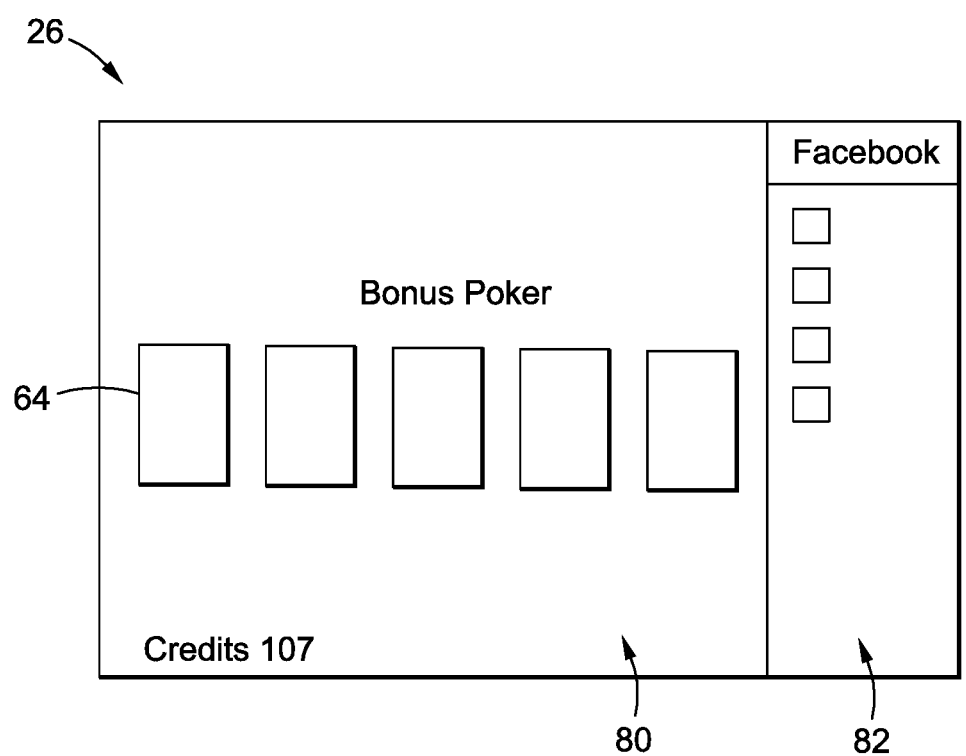
FIG. 4 illustrates a display of a casino gaming machine which simultaneously displays wagering game information and social media site information.

FIG. 4 illustrates one embodiment of information which may be displayed by a display of the casino gaming machine 26. As illustrated, the display 64 may include a main area or window 80 which displays game information. The display 64 may include a secondary area or window 82 for displaying social media information, such as information which is provided by a social media server. Such information might comprise, for example, a social media website graphical user interface or the like. Such information, including interfaces, is well known in the social media/networking art.

Figure 5:
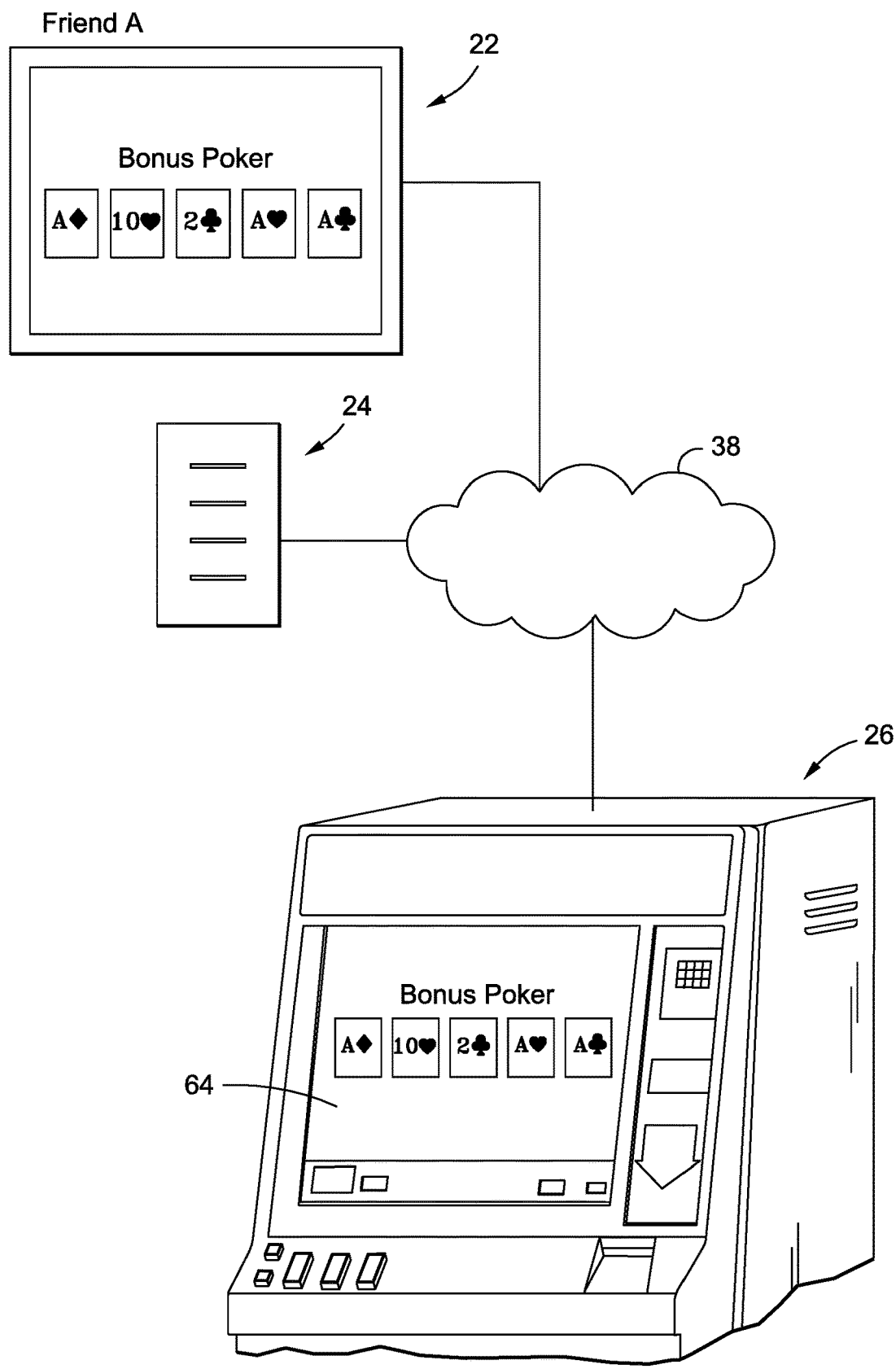
FIG. 5 diagrammatically illustrates a configuration of the invention in which information regarding a wagering game being played by a player of a casino gaming machine is presented to a third party via a social media site server.

As illustrated in FIG. 5, a player of a casino gaming machine 26 may be linked to a third party, such as Friend A, via the social media network/server in a manner which permits the third party to watch the player's game play at the casino gaming machine 26. For example, a player might play a game of Bonus Poker at the casino gaming machine 26 while they are actively linked to a social media network, such as through a social media server 24. Friend A who linked to the player via the social media network may be permitted to view the player's activities at the gaming machine. For example, as illustrated, a replicated video stream of the information which is presented to the player at the casino gaming machine 26 may be transmitted to the social media server 24 and thereon to Friend A's presentation device 22.

In one embodiment of the invention, aspects of social media activities may be converted or integrated into aspects of activities associated with casino gaming machine play, and vice versa.

In accordance with one embodiment of the invention, monetary credits associated with a casino gaming machine 26 may be converted to social media points or currency or vice versa. As indicated above, a player may be required to wager monetary value in order to play a game at the casino gaming machine 26. Such value may be represented by one or more monetary credits (such as where each credit has a specific associated monetary value such as $1.00 US, $0.25 US or the like). Likewise, a player may purchase or earn social media points or currency. Such currency may, as indicated above, be used by a player in the play of a social media game.

In one embodiment, the social media currency and gaming machine credits may be exchangeable. For example, a player might win $1000.00 at a casino gaming machine 26. Such might be represented as 1000 monetary credits each having a value of $1.00. The player might elect to simply "cash out" those credits, i.e. be paid the monetary amount which is represented by those credits. For example, the casino might pay the player $1000.00.

However, the player might alternatively convert the monetary credits to social media points or currency. In one embodiment, the monetary credits might be converted on a 1 for 1 basis (such as 1 monetary credits is converted to a corresponding social media point), or based upon a conversion rate or factor, including a transfer fee. For example, 100 monetary credits each having a value of $0.25 might be converted into 10 social media points with a 10% transfer fee, such that the player would receive 9 social media points.

Likewise, a player might convert social media points or currency into actual monetary credits for use at a casino gaming machine. Again, various conversion rates, transfer fees and the like might be applied.

In one embodiment, a player might be permitted to convert or exchange social media currency and monetary currency or credits at any time. In other embodiments, the player may also be permitted to do so at certain times. For example, a player might be awarded the opportunity to perform such an exchange upon certain criteria being met or upon certain events, such as a player receiving a particular game outcome. For example, a player might be permitted to covert social media currency into monetary credits upon receiving a winning Four of a Kind poker hand during play of a social media poker game. As another example, a player might be permitted make such a conversion when they cash out of a gaming machine or stop play of a social media game. As other examples, a player of a gaming machine might be awarded a voucher which provides the player with a certain number of social media points or currency or the like if the player redeems the voucher by playing a social media game (or vice versa), such as in accordance with terms of the voucher (e.g. play on a certain day, at a particular time, play a particular game, etc.). Similarly, a player might be provided an incentive to play a casino gaming machine or a social media game at a particular time or the like, which incentive might offer the player monetary credits or social media points. For example, a player of a social media game might be awarded monetary credits which are usable at a casino gaming machine at a particular date or time (such as during non-peak hours of 2 a.m to 5 a.m. at the casino).

In similar fashion, various promotions, bonuses and the like may be offered or awarded which "bridge" the social media game play and casino game play spaces. For example, a particular outcome of a game played at a casino gaming machine 26 might result in an award of social media points or currency (rather than monetary credits) to the player, which points or currency may be used by the player in the play of a social media game. Likewise, a particular outcome of a social media game might result in an award of monetary credits which are usable by a player to play a game at a casino gaming machine.

Of course, the games and other activities may be arranged to offer various types of awards in various fashions. For example, a game which is playable at a casino gaming machine 26 might comprise a base game with a bonus feature. The base game might offer the opportunity for monetary winnings for various outcomes. The bonus game might offer the opportunity for monetary winnings and/or social media currency or points, such as depending upon whether the player has elected to link their casino game play and social media game play. For example, if it is determined that the player has linked their casino game play with their social media game play, the casino gaming machine 26 may be configured to present the game in a mode or configuration in which all bonus awards are offered in the form of social media points or currency.

In yet another embodiment of the invention, games which are presented at a casino gaming machine 26 may be linked to a social media game. The games might be linked or connected in various manners. For example, both a social media game and a corresponding casino game might offer multiple levels of play. A player might play one or more levels of the game as a social media game and then play higher levels of the game at a casino gaming machine (whereby the player is credited with the play of the lower levels of the game via the social media site). Of course, various tokens, symbols, game outcomes, bonuses and other game features might be linked.

In another embodiment, the outcome of a casino game may be applied as an input, such as a base input, to a social media game (or vice versa). As one example, a player might play a video poker game at a casino gaming machine 26. The outcome of that game, such as a hand of cards, might be used as a starting set of cards in a social media card game.

Aspect of the invention might be implemented in various manners. In one embodiment, for example, casino gaming machines and associated devices may be custom-configured or created for implementing features of the invention. For example, a casino gaming machine 26 may be configured as a server-type gaming machine in which the gaming machine 26 links to one or more servers or other devices, thus allowing a variety of content to be provided to the gaming machine 26. Such a gaming machine 26 would thus be able to receive content from a social media server 24.

In one embodiment, various features of the invention may be implemented or facilitated by one or more secondary servers or other devices. For example, although not illustrated in FIG. 1, a casino might operate one or more casino servers. Such a server may serve as a bridge to facilitate the features of the invention, including the exchange of information between a casino gaming machine and a social media server. For example, a player of a casino gaming machine 26 might make a request or input to link to a social media site. Such a request might be transmitted from the casino gaming machine 26 over a local network to the casino server. The casino server might, in turn, send a request to the social media server 24. Upon receipt of a request, the social media server 24 might send a response (such as graphical user interface website information). This response might be transmitted to the casino server and thereon to the casino gaming machine 24. In this configuration, the casino server is configured to transmit and receive request and response information between one or more casino gaming machines 26 and the social media server 24. Such a casino server might also track the exchange of monetary gaming machine credits and social media points or currency It will also be appreciated that the casino gaming machine 26 may be programmed to implement various of the features herein. For example, the casino gaming machine 26 may be configured to display one or more graphical user interfaces which permit the player to make various selections, such as to open a web browser, display social media site content or the like.

In other embodiments, a casino gaming machine 26 may be modified to implement the features of the invention. Currently there are tens of thousands of existing casino gaming machines 26 which were custom-created to present specific games. These gaming machines were not designed to permit new games or other content to be presented by the machine without essentially re-programming the entire gaming machine. Such gaming machines are often referred to as "legacy" gaming machines.

In one embodiment, legacy gaming machines may be modified to implement the present invention. In a preferred embodiment of the invention, a gaming machine is retro-fit with a secondary controller. One embodiment of such a configuration is illustrated in FIG. 6.

Figure 6:
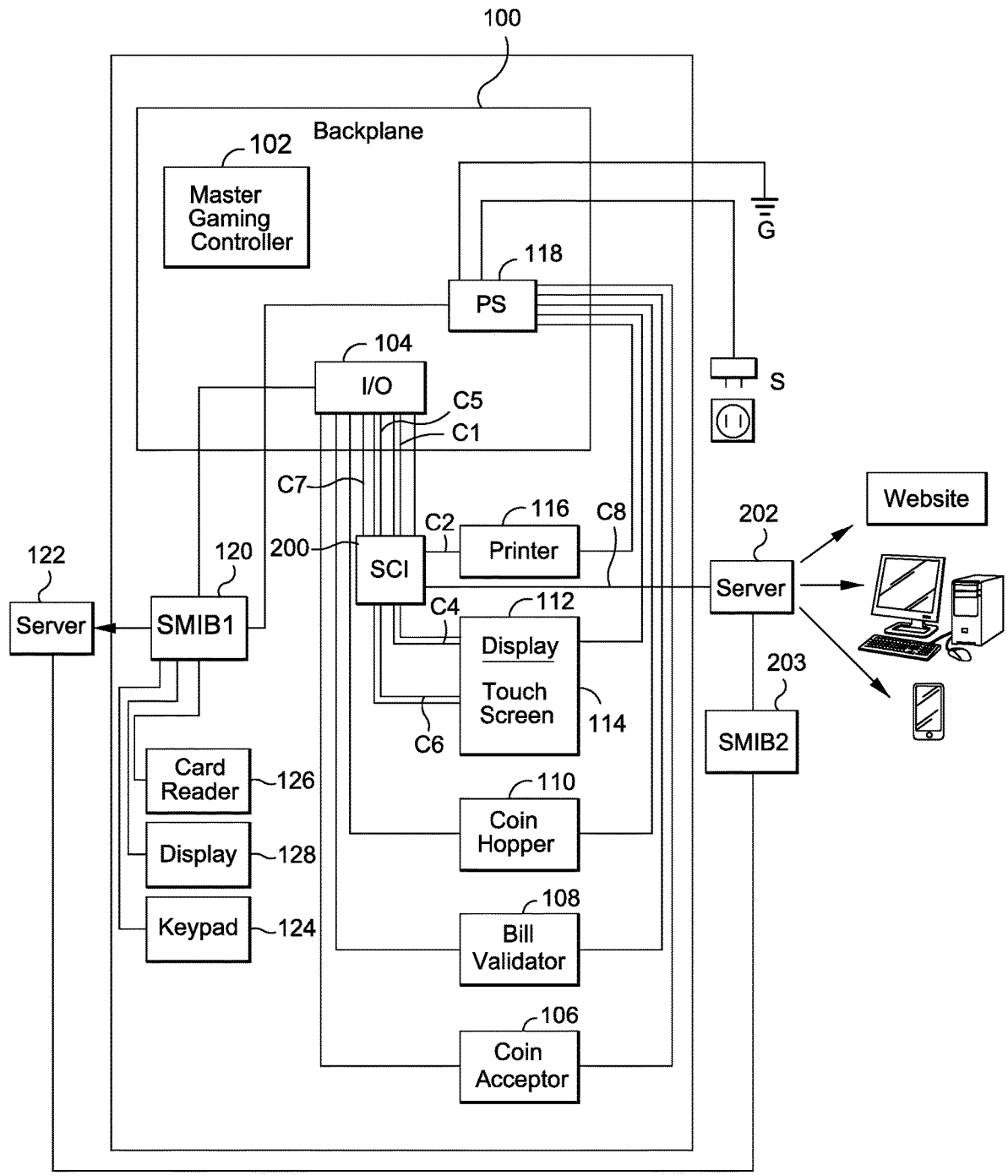
FIG. 6 diagrammatically illustrates one configuration of a casino gaming machine having a secondary interface for facilitating features of the invention.

As illustrated in FIG. 6, in one embodiment a legacy casino gaming machine has a backplane 100 which supports a main or master gaming controller 102. The master gaming controller 102 may comprise a computer processing unit and may include one or more associated components, such as memory devices or the like. In general, the master gaming controller 102 is configured to execute machine readable code for use in operating the gaming device. For example, the master gaming controller 102 may generate signals used to control various components of the gaming machine and/or generate data for use by those components.

An input/output (I/O) board 104 is associated with the master gaming controller 102. The I/O board 104 may be part of the master gaming controller 102 or, as illustrated in FIG. 6, be connected to the backplane 100. The input/output board 104 may include various connectors or communication ports for use in connecting various components to the master gaming controller 102 (whereby the master gaming controller 102 may provide information, to the components, and/or receive information from those components). As used herein, the information or data may have any of a variety of forms now known or later developed, whether analog or digital, on/off, numeric, wave form or having any other configuration. The input/output board 104 may, for example, include one or more serial (such as RS-232), parallel, USB, Firewire® or other types of connections.

The gaming machine may include a variety of peripheral devices for use in presenting games to a player. For example, the gaming machine may include: a coin acceptor 106 for accepting coins for one or more wagers; a bill validator 108 for accepting paper currency, tickets or other printed documents representing value for one or more wagers; a coin hopper 110 for storing received coins and from which coin payouts may be paid; at least one display 112 for displaying game information, which display may have an associated touch screen 114 for receiving player touch input, and a printer 116 for printing tickets or other media. Of course, the gaming machine might have a wide variety of peripherals or other components, including buttons, rotatable arms, joysticks, trackballs, speakers and other devices.

As illustrated, each of these peripheral devices preferably communicates with the master gaming controller 102 via a communication connection through the I/O board 104 associated with the backplane 100. The particular connection might vary. For example, the printer 116 might be a USB-type device and thus interface with the I/O board 104 via a USB connection and associated port. The coin hopper 110, however, might be an RS-232 type device and connect to the I/O board 104 via a 9 pin connector. Preferably, the master gaming controller 102 can control these various peripheral devices via the communication connections therewith.

The various electrical or electro-mechanical devices of the gaming machine are powered. As illustrated, a power supply 118 may be associated with the backplane 100. The power supply 118 preferably connects to a ground G and an external power source S. The power supply 118 preferably provides power to the master gaming controller 102 and the various peripheral devices of the gaming machine, as illustrated. In one embodiment, the gaming machine may be configured to implement gaming machine accounting and player tracking functions. These operations may be facilitated by a Slot Machine Interface Board or "SMIB" 120. As illustrated, the SMIB 120 may connect to the master gaming controller 102 via the backplane 100, and may communicate with an external server 122 via a communication link. In one prior art configuration, the gaming machine may utilize a Slot Accounting Standard or "SAS" protocol in order to implement various gaming machine accounting functions (such as tracking of wagers, game wins and other information, as is known in the art). Due to the interface with the external server, the gaming machine accounting information may be obtained or tracked externally to the machine.

In addition, the gaming machine may include a player tracking feature. The player tracking feature may be implemented via components such as a keypad 124, a card reader 126 for reading cards or other media, other peripheral devices, such as a display 128. The player tracking devices or components may interface with the SMIB 120, and thus with the external server 122. In this manner, information regarding a particular player's play may be tracked. For example, a player may insert a player card having player identification information associated therewith, and that information may be provided to the server 122. Thereafter, game play information may be provided to the server 122, as known to be associated with the particular player identified by the provided identification information.

As just described, the gaming machine is a fully integrated and pre-configured device for presenting one or more wagering games to a player. As indicated above, however, such a gaming machine has a number of drawbacks owing to the specific configuration of the device.

In a preferred embodiment of the present invention, a secondary controller or interface (SCI) is provided which, when associated with a gaming machine, permits the gaming machine to provide additional or secondary functionality from its basic or pre-configured functionality. In one embodiment, the SCI is particularly suited to use with an existing gaming machine, including a gaming machine pre-configured in the manner illustrated in FIG. 1 and described above, or in a manner similar thereto.

The SCI, its method of use, its association with a gaming machine and system of the invention, will now be described first with reference to FIG. 2. In this figure, the SCI 200 is shown in association with a gaming machine configured as illustrated in FIG. 1. As such, the above-described components have been given like reference numbers.

The SCI 200 preferably comprises hardware, such as one or more circuit boards. The SCI 200 may comprise software, such as machine readable code. Such software, however, may be implemented as hardware.

In one embodiment, the SCI 200 is configured to communicate with one or more components of a gaming machine. As such, the SCI 200 includes one or more ports via which communication links may be established between the SCI 200 and those components. Referring to FIG. 6, in one embodiment, the SCI 200 is interposed between various of the components of the gaming machine and the I/O board 104, and thus the master gaming controller 102 (which receives information or signals from the I/O board 104 and provides information or signals to the I/O board 104). In this manner, the SCI 200 can monitor or override instructions or data provided to those components by the master gaming controller 102 and monitor or override instructions or data provided by those components and intended for the master gaming controller 102.

As illustrated, the SCI 200 is interposed between the I/O board 104 and the printer 116, the I/O board 104 and the display 112, and the I/O board 104 and the touch screen 114. The SCI 200 may be interposed between the I/O board 104 and other of the components. A first communication link C1 is provided between the SCI 200 and the I/O board 104. A second communication link C2 is provided between the SCI 200 and the printer 116. In combination, these communication links C1 and C2 permit the master gaming controller 102 to still communicate with the printer 116 through the SCI 200 (preferably as controlled or monitored by the SCI 200). In addition, however, this configuration permits the SCI 200 to communicate directly with the printer 116.

Similarly, a first communication link C3 is provided between the SCI 200 and the I/O board 104. A second communication link C4 is provided between the SCI 200 and the display 112. In combination, these communication links C3 and C4 permit the master gaming controller 102 to still communicate with the display 112 through the SCI 200 (preferably as controlled or monitored by the SCI 200). In addition, this configuration permits the SCI 200 to communicate directly with the display 112.

A first communication link C5 is provided between the SCI 200 and the I/O board 104. A second communication link C6 is provided between the SCI 200 and the touch screen 114. In combination, these communication links C5 and C6 permit the master gaming controller 102 to still communicate with the touch screen 114 though the SCI 200 (preferably as controlled or monitored by the SCI). In addition, this configuration permits the SCI 200 to communicate directly with the touch screen 114.

It will be appreciated that the communication protocols utilized between the various components and the configuration of the communication ports and links may vary dependent primarily upon the configuration of the components. For example, if the printer 116 is configured as a USB type device, a USB communication protocol and associated ports may be utilized. In other embodiments, parallel, serial or other communication protocols and configurations may be utilized. The communication links may be wired or wireless.

In one embodiment, a communication link C7 is provided between the SCI 200 and the I/O board 104. In a preferred configuration, the communication link C7 is established between the SCI 200 and a secondary SAS port of the master gaming controller 102. In particular, one common configuration for the master gaming controller 102 is to have two communication ports through which communications may be established using the SAS protocol. As indicated above, in a common gaming machine configuration, the master gaming controller 102 may communicate with the SMIB 120 via one of these ports, generally the "primary" port. In a preferred configuration, the SCI 200 is connected to the master gaming controller 102 via the secondary port.

Yet another communication link C8 is provided between the SCI 200 and at least one external device. Preferably, that device comprises at least one server 202. The SCI 200 may transmit information over this communication link C8 to the server 202 and/or receive information over this link from the server 202. It will be appreciated that the SCI 200 might be configured to communicate with more than one external device, such as more than one server or other sources of information, either via one or more communication links. In one embodiment, the server or servers 202 may include a game management system, a media management system and/or a feed of media content (such as television/cable).

In a preferred embodiment, the server or servers 202 performs validation/redemption functions. In such an embodiment, the server or servers 202 may communicate with one or more external SMIBs 203, which SMIBs 203 is communication with the gaming system external server 122 (which may perform host accounting and/or player tracking functions, among others). The number of external SMIBs 203 may vary, such as to ensure that a sufficient number of SMIBs exist to process transactions forwarded by the SCI 200.

Power may be provided to the SCI 200 from a dedicated power source or via the power source S to the gaming machine.

In this configuration, the interposition of the SCI 200 into the gaming machine does not interfere with the normal operation of the gaming machine. In particular, the gaming machine may present one or more wagering games or other events or activities to a player, as the gaming machine was originally designed. For example, in the presentation of a game, the master gaming controller 102 generates game data for display by the display 112. This data is simply transmitted to the I/O board 104 and then along communication links C3 and C4 to the display 112, through the SCI 200. Likewise, a player's touch input to the touch screen 114 is transmitted to the master gaming controller 102 via communication links C5 and C6 through the SCI 200.

In one embodiment, various features of the invention may be implemented through the SCI 200. For example, the SCI 200 may connect to a casino server 202 which, in turn, connects to a social media server 24 (though it is also possible for the SCI 200 to connect directly to a social media server 24 via a communication link). In this manner, game content which is generated at the gaming machine 26 by the master gaming controller 102 or the SCI 200 may be provided to the social media server 24. As indicated above, for example, such might comprise information regarding a game which a player is playing, which information may then be broadcast to the player's social media friends. Likewise, information or content which is generated externally, such as at the social media server 24, may be provided to the gaming machine 26. For example, social media game information may be transmitted from a social media server 24 via a communication link to the SCI 200 of the gaming machine 26, thus permitting that information to be displayed by the gaming machine 26.

As one example, the SCI 200 may capture the video output of the gaming controller 102. The SCI 200 may then route that video information to a social media server for transmission to a third party. Likewise, input from a user of a social media website could be routed from the social media server to the SCI 200 for transmission to the gaming controller 102.

As indicated herein, in one or more embodiment, aspects of a player's activities may be tracked. In one embodiment, a player's casino gaming activities may be tracked by a player tracking system, such as via the player tracking server 42. Such systems are well known in the art and are thus not described in detail herein. Of course, the player's social media activities may be tracked by the social media server, as also known to those of skill in the art.

In one embodiment of the invention, social media account information and casino player tracking account information may be shared or linked. For example, a player may link their social media account login information to their casino player card. When the player utilizes their casino player card at a casino gaming machine, the gaming machine may have access to the player's social media account login information. Thus, if the player provides an input to the casino gaming machine indicating that they would like to accesses their social media account, their account login information may automatically be transmitted to the social media server without the player having to input that information at the casino gaming machine.

Likewise, if the player is utilizing their social media account via a presentation device and the player seeks to play a casino gaming machine, the player's presentation device or the social media server may transmit the player's casino player account information to the casino server or casino gaming machine. In this manner, the player is identified to the casino system, such as to track the player's play and award player loyalty rewards and the like.

In one embodiment, the SCI 200 may again serve as the link between aspects of a social media system and a casino system. For example, player tracking information from a casino player tracking system may be transmitted via the SCI 200 to a social media server, such as for linking or exchanging player play information. Likewise, the SCI 200 may serve as the interface for exchanging information regarding monetary credits and social media currency. For example, a "convert" instruction as to monetary credits at a casino gaming machine may be transmitted from the gaming controller 102 to the SCI 200, which then interfaces with a social media currency feature of a social media system (for example, the SCI 200 then becomes a bridge or link between the casino accounting system and a social media accounting server), thereby effecting the conversion.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A modified gaming machine comprising:
a housing;
at least one video display;
at least one player input device;
a main game controller configured to present at least one wagering game to a player utilizing wagering credits converted from monetary value, including displaying information regarding said wagering game via said at least one video display; and
a secondary controller, said secondary controller located within said housing and configured to communicate with at least one social media site server which is configured to present one or more social media events to said player using social media points or currency, including transmitting information to said at least one social media site server and receiving information from said at least one social media site server via at least one communication link, wherein one or more wagering credits associated with said gaming machine is converted to social media points or currency.

2. The modified gaming machine in accordance with claim 1 wherein a number of wagering credits associated with said gaming machine is reduced based upon conversion of said one or more wagering credits to social media points or currency.

3. The modified gaming machine in accordance with claim 1 wherein said secondary controller is configured to receive social media account information from said player via said at least one player input device, and wherein one or more wagering credits are converted to said social media points or currency and are associated with said player's social media account.

4. The modified gaming machine in accordance with claim 1 wherein said one or more social media events comprise a social media game presented via input by said player at said gaming machine.

5. The modified gaming machine in accordance with claim 1 wherein the transmitted information comprises an instruction to convert the wagering credits at the casino gaming machine.

6. A modified gaming machine comprising:
a housing;
at least one video display;
at least one player input device;
a main game controller configured to present at least one wagering game to a player utilizing wagering credits converted from monetary value associated with a credit balance, including displaying information regarding said wagering game via said at least one video display; and
a secondary controller, said secondary controller located within said housing and configured to communicate with at least one social media site server which is configured to present one or more social media events to said player using social media points or currency, including transmitting information to said at least one social media site server and receiving information from said at least one social media site server via at least one communication link; and wherein one or more social media points or currency associated with said account is converted to one or more wagering credits.

7. The modified gaming machine in accordance with claim 6 wherein said secondary controller communicates with said social media site via at least one casino server.

8. The modified gaming machine in accordance with claim 6 wherein said information regarding said wagering game is presented in a first portion of one of said at least one video displays and social media information is presented in a second portion of said video display.

9. The modified gaming machine in accordance with claim 6 wherein one or more of said social media points or currency are awarded as a result of a particular outcome of a game played at said modified gaming machine.

10. The modified gaming machine in accordance with claim 6 wherein the transmitted information comprises an instruction to convert the wagering credits at the casino gaming machine.

\* \* \* \* \*